US012580224B2

(12) United States Patent
Aykol et al.

(10) Patent No.: US 12,580,224 B2
(45) Date of Patent: Mar. 17, 2026

(54) SOLVENT-REAGENT BASED SYNTHESIS OF SOLID-STATE ELECTROLYTES

(71) Applicant: Rivian IP Holdings, LLC, Plymouth, MI (US)

(72) Inventors: Muratahan Aykol, San Jose, CA (US); Parameswara Rao Chinnam, Idaho Falls, ID (US)

(73) Assignee: Rivian IP Holdings, LLC, Irvine, CA (US)

( * ) Notice: Subject to any disclaimer, the term of this patent is extended or adjusted under 35 U.S.C. 154(b) by 749 days.

(21) Appl. No.: 17/878,441

(22) Filed: Aug. 1, 2022

(65) Prior Publication Data

US 2024/0039038 A1 Feb. 1, 2024

(51) Int. Cl.
H01M 10/0562 (2010.01)
C01B 25/14 (2006.01)
H01M 10/0525 (2010.01)

(52) U.S. Cl.
CPC ......... H01M 10/0562 (2013.01); C01B 25/14 (2013.01); H01M 10/0525 (2013.01); *C01P 2002/54* (2013.01); *C01P 2006/40* (2013.01); *H01M 2220/20* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 4,595,779 A | 6/1986 | Morrison et al. | |
| 6,787,661 B2 | 9/2004 | Li et al. | |
| 2019/0074544 A1* | 3/2019 | Senga ...................... | H01B 1/10 |

OTHER PUBLICATIONS

Pilgaard, Acetone Physical properties, 2016, https://pilgaard.info/Ketones/Acetone/Physicals.htm (Year: 2016).*
Dutrizac, The effect of seeding on the rate of precipitation of ammonium jarosite and sodium jarosite, Hydrometallurgy, 1996 (Year: 1996).*
Anderson, Practical use of continuous processing in developing and scaling up laboratory processes, Organic Process Research & Development, 2001 (Year: 2001).*

* cited by examiner

*Primary Examiner* — Keling Zhang
(74) *Attorney, Agent, or Firm* — Foley & Lardner LLP

(57) ABSTRACT

The present disclosure is to processes for the preparation of argyrodite type materials, use of such argyrodite type materials in synthesis of solid-state electrolytes, and inclusion in secondary rechargeable batteries such as lithium ion batteries (LIBs), solid state batteries (SSBs), and/or lithium metal batteries (LMBs). For example, in an aspect the present disclosure provides a process that includes contacting a lithium source with a phosphorus source in a solvent-reagent at a temperature from about 80° C. to about 120° C. to form a precipitate comprising the $Li_{7-x}PS_{6-x}Y_x$ (where Y is Cl, Br, or I, and $0<x<2$) and a supernate, and then collecting the precipitate. The solvent-reagent includes $S_yY_w$ where $y \geq 1$, Y is as discussed previously (Y is Cl, Br, or I), and $0<w \leq 2$.

13 Claims, 5 Drawing Sheets

RECOVER AND RE-ADJUST COMPOSITION OF SOLVENT-REAGENT

TUNE SULFUR CONTENT AND TEMPERATURE OF SOLVENT-REAGENT

CONTINUOUSLY MIX LITHIUM SOURCE AND PHOSPHOROUS SOURCE

ADJUST TEMPERATURE AND SULFUR CONTENT

CONTINUOUS MIXING

CATALYST SEED $Li_{7-x}PS_{6-x}Y_x$ PRODUCT

COLLECT PRECIPITATE

SOLVENT-REAGENT BASED SYNTHESIS OF SOLID-STATE ELECTROLYTES

INTRODUCTION

The present technology is generally related to processes for the preparation of argyrodite type materials and use of such argyrodite type materials in synthesis of solid-state electrolytes. More particularly, the present technology relates to the preparation of such materials and solid-state electrolytes for use in secondary rechargeable batteries, such as lithium ion batteries (LIBs), solid state batteries (SSBs), and/or lithium metal batteries (LMBs).

SUMMARY

Use of solid-state electrolytes (SSEs) can unlock higher energy density lithium metal batteries (LMBs) and/or solid-state batteries (SSBs) such as lithium ion SSBs. One of the most promising classes of SSEs for the EV industry is the argyrodite type $Li_6PS_5Cl$ (LPSCl) and derivatives. Current synthesis methods for LPSCl include solid-state and solution routes, which involve expensive raw materials (e.g., $Li_2S$), are hard to scale up industrially and/or achieve phase purity.

In addressing such issues, in an aspect the present technology provides a process that includes contacting a lithium source with a phosphorus source in a solvent-reagent at a temperature from about 80° C. to about 120° C. to form a precipitate that includes $Li_{7-x}PS_{6-x}Y_x$ (where Y is Cl, Br, or I, and $0<x<2$) and a supernate, and then collecting the precipitate. The solvent-reagent includes $S_yY_w$, where $y \geq 1$, Y is as discussed previously (Y is Cl, Br, or I), and $0<w \leq 2$.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

DETAILED DESCRIPTION

Figures 1, 2:
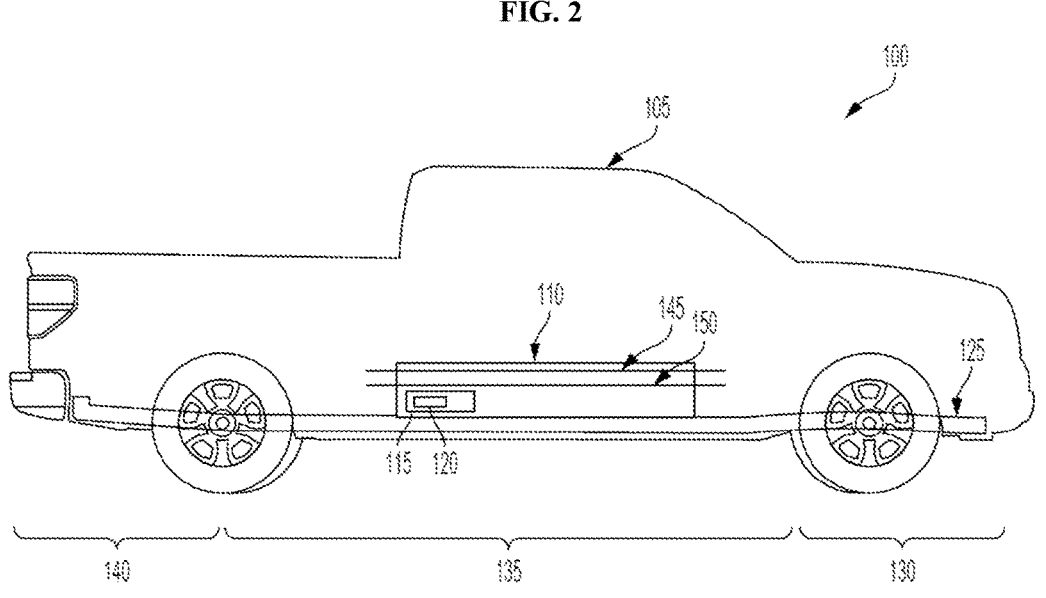
FIG. 1 is an exemplary flow diagram of various embodiments of a process of the present technology.
FIG. 2 is an illustration of a cross-sectional view of an electric vehicle, according to various embodiments.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The phrase "and/or" as used in the present disclosure will be understood to mean any one of the recited members individually or a combination of any two or more thereof— for example, "A, B, and/or C" would mean "A, B, C, A and B, A and C, B and C, or the combination of A, B, and C."

As used herein, "substantially in the absence of" as used in the present disclosure will be understood to mean a concentration of 20 parts per million (ppm) or less of the referenced substance(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The argyrodite family of electrolytes of composition $Li_{7-x}PS_{6-x}Cl_x$, (LPSCl), such as $Li_6PS_5Cl$, offer remarkable solid-state conductivity for $Li^+$ ion ($10^{-2}$-$10^{-3}$ S/cm), good processability with the current industrial Li-ion manufacturing pipelines and consist of earth-abundant elements. These qualities hence make LPSCl based electrolytes highly desirable for SSB applications. One of the main bottlenecks against their broader use is the cost and scale-up issues associated with the current synthesis methods that use solid-state and solution techniques used in making LPSCl. The typical solid-state routes reported in literature involve mixing, milling, and high temperature sintering of starting materials at stoichiometric ratios, including LiCl, $P_2S_5$ and $Li_2S$; the typical solution synthesis routes reported in the literature involve co-precipitation, filtering, drying, and high temperature sintering, starting again with the same set of starting materials with the added expense of a solvent. Both routes are energy intensive, have phase purity and completion challenges, and are difficult to scale up. The excessive cost of $Li_2S$ is an additional factor that hinders industrial adoption of LPSCl. Therefore, it is desirable to find a synthesis methodology that utilizes cost effective and readily available raw or starting materials, a less energy-intensive and controllable process that can scale up.

In an aspect, a process is provided that includes contacting a lithium source with a phosphorus source in a solvent-reagent at a temperature from about 80° C. to about 120° C. to form a precipitate that includes $Li_{7-x}PS_{6-x}Y_x$ (where Y is Cl, Br, or I, and $0<x<2$) and a supernate, and then collecting the precipitate. Thus, in any embodiment herein, the precipitate may include $Li_{7-x}PS_{6-x}Cl_x$, $Li_{7-x}PS_{6-x}Br_x$, $Li_{7-x}PS_{6-x}I_x$, or a combination of any two or more thereof. The solvent-reagent includes $S_yY_w$ where $y \geq 1$, Y is as discussed previously (Y is Cl, Br, or I), and $0 < w \leq 2$. Thus, in any embodiment herein, the solvent-reagent may include $S_yCl_w$, $S_yBr_w$, $S_yI_w$, or a combination of any two or more thereof. In any embodiment herein, the precipitate may include $Li_{7-x}PS_{6-x}Cl_x$ and optionally include $Li_{7-x}PS_{6-x}Br_x$ and/or $Li_{7-x}PS_{6-x}I_x$. In any embodiment herein, solvent-reagent may include $S_yCl_w$ and optionally include $S_yBr_w$ and/or $S_yI_w$. In any embodiment herein, x may be 1.

The contacting may be conducted substantially in the absence of oxygen, moisture, or both oxygen and moisture. In any embodiment herein, the contacting may be conducted in the absence of oxygen, moisture, or both oxygen and moisture. The contacting may take place under anhydrous conditions and/or conducted under an inert atmosphere ($N_2$, He, Ar, etc.). Collecting the precipitate may include filtration or decantation.

The phosphorus source of any embodiment disclosed herein may be $P^0$, $PCl_3$, $PCl_5$, $P_2S_5$, or a mixture of any two or more thereof. The lithium source of any embodiment disclosed herein may include $Li^0$, LiCl, $Li_2S$, $Li_2O$, LiP, $Li_3P$, or a mixture of any two or more thereof. The lithium source may include a lithium foil, a lithium ribbon, lithium particles, a lithium sand, or a mixture of any two or more thereof. For example, because reactions including a lithium source may be highly exothermic, LiCl or mixtures of $Li^0$ and LiCl may be included in the process to control excess heat.

In any embodiment herein, the temperature may be about 80° C., about 82° C., about 84° C., about 86° C., about 88° C., about 90° C., about 92° C., about 94° C., about 96° C., about 98° C., about 100° C., about 102° C., about 104° C., about 106° C., about 108° C., about 110° C., about 112° C., about 114° C., about 116° C., about 118° C., about 120° C., or any range including and/or in between any two of these values. The process of any embodiment herein may be conducted in reactor, such as in a continuous reactor or in a batch reactor, where the reactor may optionally include a cooling and/or heating system to control the temperature of the process.

As disclosed above, the solvent-reagent includes $S_yY_w$. In any embodiment herein, w may be 1. In any embodiment herein, y may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any range including and/or in between any two of these values. In any embodiment herein, the solvent-reagent may include $S_yY$ where $50 \geq y \geq 1$; thus, y may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any range including and/or in between any two of these values. In any embodiment herein, the solvent-reagent may include $S_yY_2$, optionally where y may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any range including and/or in between any two of these values.

In any embodiment of the process of the present technology, the process may include a molar ratio of $S_yY_w$ to lithium source of about 1000:1 to 1:1. Thus, in any embodiment the molar ratio of $S_yY_w$ to lithium source may be about 1000:1, about 900:1, about 800:1, about 700:1, about 600:1, about 500:1, about 400:1, about 300:1, about 200:1, about 100:1, about 90:1, about 80:1, about 70:1, about 60:1, about 50:1, about 40:1, about 30:1, about 20:1, about 10:1, about 5:1, about 1:1, or any range including and/or in between any two of these values.

In any embodiment herein, the contacting may further include precipitating the $Li_{7-x}PS_{6-x}Y_x$ by seeding with exogenous $Li_{7-x}PS_{6-x}Y_x$ and/or lowering the temperature of the supernate to induce additional precipitation of the $Li_{7-x}PS_{6-x}Y_x$. The process of any embodiment herein may be conducted in a continuous reactor or in a batch reactor. The process of any embodiment herein may further include densification of the precipitate. Such densification may include heat treatment, calcination, and/or exposure to an elevated temperature to allow for adequate densification. The process of any embodiment herein may further include annealing of the precipitate (e.g., for densification). Such annealing may include heat treatment, calcination, and/or exposure to a temperature of about 400° C. to about 600° C., e.g., for about 5 hours to about 10 hours to provide adequate densification.

FIG. 1 provides an exemplary flow diagram of various embodiments of a process of the present technology. As illustrated in FIG. 1, the process may in effect be executed continuously by continuously replenishing the solvent-reagent and adding the lithium source and phosphorous source while the precipitate and $Li_{7-x}PS_{6-x}Y_x$ product is removed. Given formation of $Li_{7-x}PS_{6-x}Y_x$ may generally occur in liquid solvent-reagent in various embodiments of the process, FIG. 1 illustrates the process of the present technology may include conveniently induce or catalyze precipitating $Li_{7-x}PS_{6-x}Y_x$ by seeding with exogenous $Li_{7-x}PS_{6-x}Y_x$ (such as by seeding with product from the process).

In an aspect, a composition is provided that includes $Li_{7-x}PS_{6-x}Y_x$ formed according to a process of any embodiment of the present technology. In any embodiment herein, the composition may further include a binder such as a compatible polymer binder. Illustrative binders may include, but are not limited to, polymeric materials such as polyvinylidenefluoride (PVDF), polyvinylpyrrolidone (PVP), styrene-butadiene or styrene-butadiene rubber (SBR), polytetrafluoroethylene (PTFE), carboxymethylcellulose (CMC), nitrile butadiene rubber (NBR), a styrene-ethylene-butylene-styrene (SEBS), styrene-butylene-styrene (SBS), styrene-isoprene-styrene (SIS), or a mixture of any two or more thereof. Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA) , poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or a mixture of any two or more thereof. In any embodiment herein, the composition may be a solid-state electrolyte.

In generating an argyrodite type solid-state electrolyte from a $Li_{7-x}PS_{6-x}Y_x$ of the present technology, a "wet" or liquid-phase approach may be utilized or a dry-mixing approach (e.g., mechanical ball-milling) may be utilized. Liquid-phase approaches may be attractive for large-scale production, however there can be compatibility issues with certain polar organic solvents, residual organic solvents, and/or impurities that can hinder the transport of $Li^+$ and result in a decrease in the ionic conductivity of the solid-state electrolyte. Further, liquid-phase approaches utilizing organic solvents may add cost as solvent abatement and/or purification may be required for large-scale production. Typically, in dry-mixing approaches, raw materials are mixed, e.g., via high energy mechanical mixing, followed by annealing at a temperature of about 400° C. to about 600° C. for glassification and crystallization.

Thus, in another aspect, the present technology provides a method for making a solid-state electrolyte that includes milling a $Li_{7-x}PS_{6-x}Y_x$ formed according to a process of any embodiment of the present technology. In any embodiment herein, milling the $Li_{7-x}PS_{6-x}Y_x$ may include milling a combination including a binder and the $Li_{7-x}PS_{6-x}Y_x$. Illustrative binders may include, but are not limited to, polymeric materials such as polyvinylidenefluoride (PVDF), polyvinylpyrrolidone (PVP), styrene-butadiene or styrene-butadiene rubber (SBR), polytetrafluoroethylene (PTFE), carboxymethylcellulose (CMC), nitrile butadiene rubber (NBR), a styrene-ethylene-butylene-styrene (SEBS), styrene-butylene-styrene (SBS), styrene-isoprene-styrene (SIS), or a mixture of any two or more thereof. Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or a mixture of any two or more thereof.

In yet another aspect, the present technology provides a method for making a solid-state electrolyte that includes drying, calcination, and/or sintering of a $Li_{7-x}PS_{6-x}Y_x$ formed according to a process of any embodiment of the present technology.

In another aspect, the present technology provides an electrochemical cell, such as a lithium secondary battery, a lithium ion battery, and/or a lithium metal battery, that includes a $Li_{7-x}PS_{6-x}Y_x$ formed according to a process of any embodiment of the present technology and/or a solid-state electrolyte according to any embodiment of the present technology. Where the electrochemical cell of the present technology is a lithium secondary battery (e.g., a lithium ion battery and/or a lithium metal battery), the lithium secondary battery may also optionally include a cathode, an anode, a separator, a current collector, a housing, or a combination of any two or more thereof. The housing may be a pouch in which a battery cell is contained, or it may be the housing the battery in which the pouches are contained.

The anodes of the electrochemical cells may include lithium. The electrochemical cell of any embodiment herein may include a current collector (e.g., Cu foil) with an in situ-formed anode (e.g., Li metal) on a surface of the current collector facing the separator or solid-state electrolyte such that in an uncharged state, the assembled cell does not comprise an anode active material.

The cathodes and anodes may also each include, independently of each other, other materials such as conductive carbon materials, current collectors, binders, and other additives. Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In any embodiment herein, the metal of the current collector may be in the form of a metal foil. For example, the current collector may be an aluminum (Al) or copper (Cu) foil. In any embodiment herein, the current collector may include a metal alloy, e.g., made of Al, Cu, Ni, Fe, Ti, or combination of any two or more thereof. The metal foils of any embodiment herein may be coated with carbon: e.g., carbon-coated Al foil and the like.

In another aspect, the present disclosure provides a battery pack that includes a $Li_{7-x}PS_{6-x}Y_x$ formed according to a process of any embodiment of the present technology, a solid-state electrolyte according to any embodiment of the present technology, an electrochemical cell according to any embodiment of the present technology, and/or a battery according to any embodiment of the present technology. The battery pack may find a wide variety of applications including but are not limited to general energy storage or in vehicles.

In another aspect, a plurality of battery cells as described above may be used to form a battery and/or a battery pack that may find a wide variety of applications such as general storage, or in vehicles. By way of illustration of the use of such batteries or battery packs in an electric vehicle, FIG. 2 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 3:
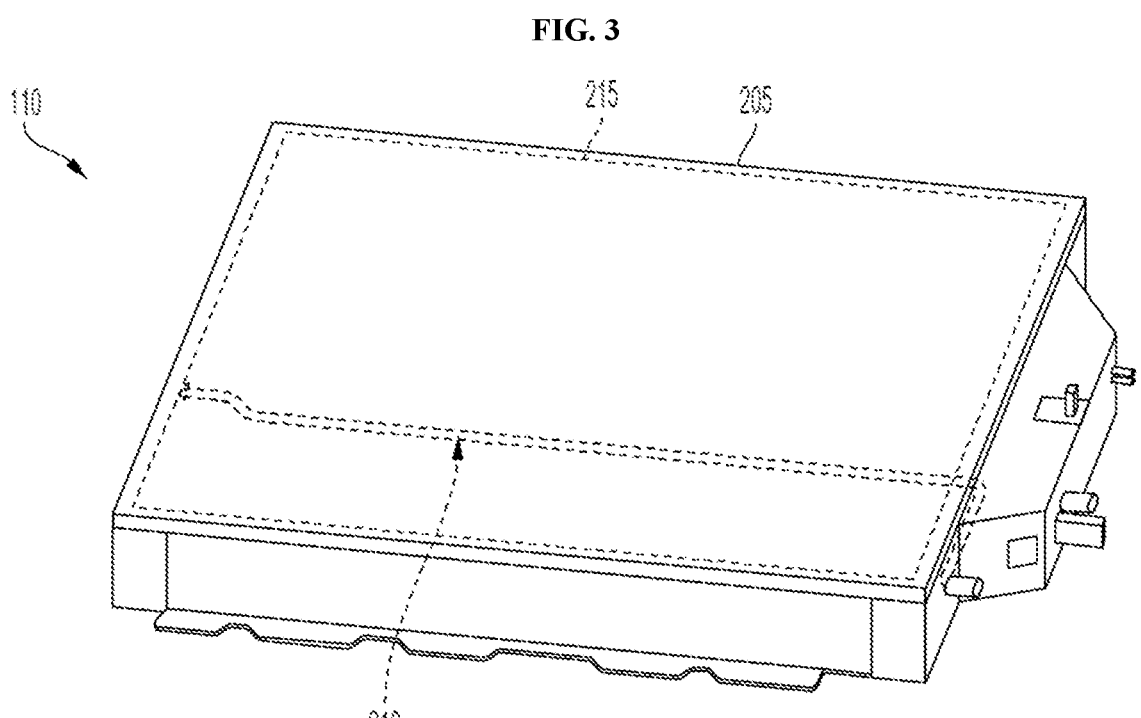
FIG. 3 is a depiction of an illustrative battery pack, according to various embodiments.

FIG. 3 depicts an example battery pack 110. Referring to FIG. 2 among others, the battery pack 110 can provide power to electric vehicle 105. Battery packs 110 can include any arrangement or network of electrical, electronic, mechanical, or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 4:
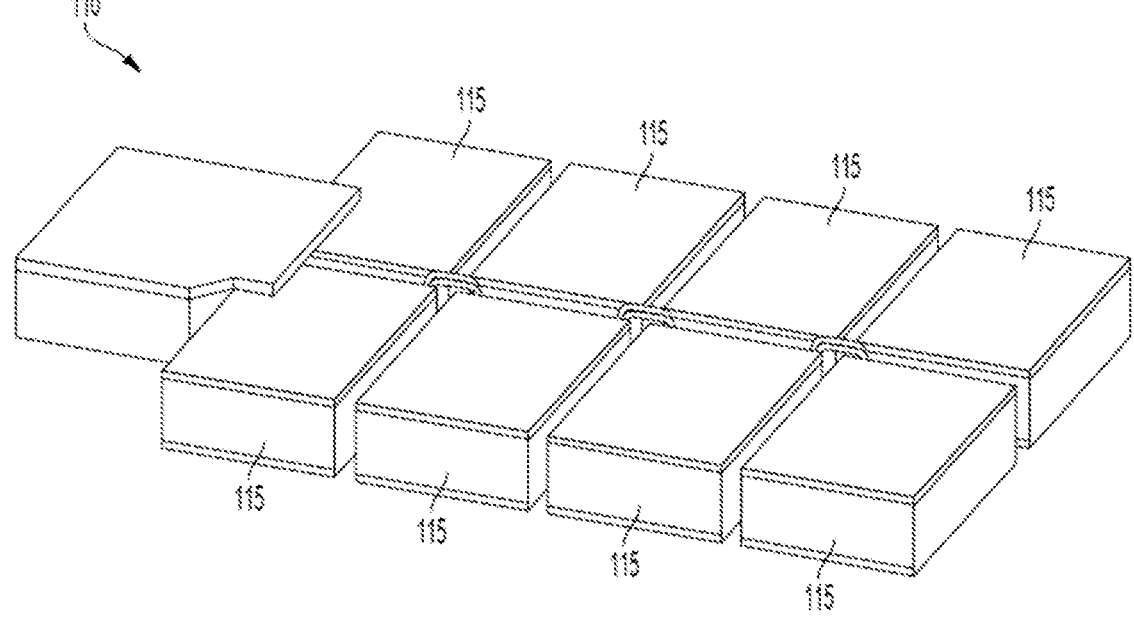
FIG. 4 is a depiction of an illustrative battery module, according to various embodiments.
Figure 5:
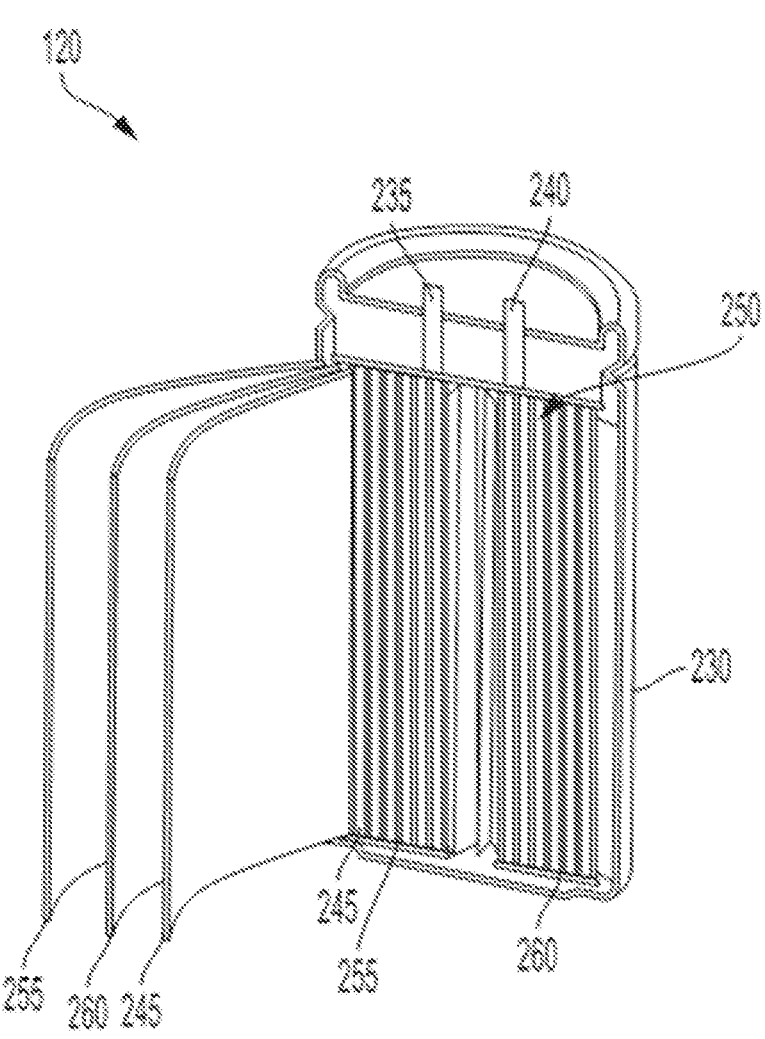
FIGS. 5, 6, and 7 are cross sectional illustrations of various batteries, according to various embodiments.

FIG. 4 depicts example battery modules 115, and FIG. 5 depicts an illustrative cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells (e.g., FIG. 5) or prismatic cells (e.g., FIG. 6), for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Figure 6:
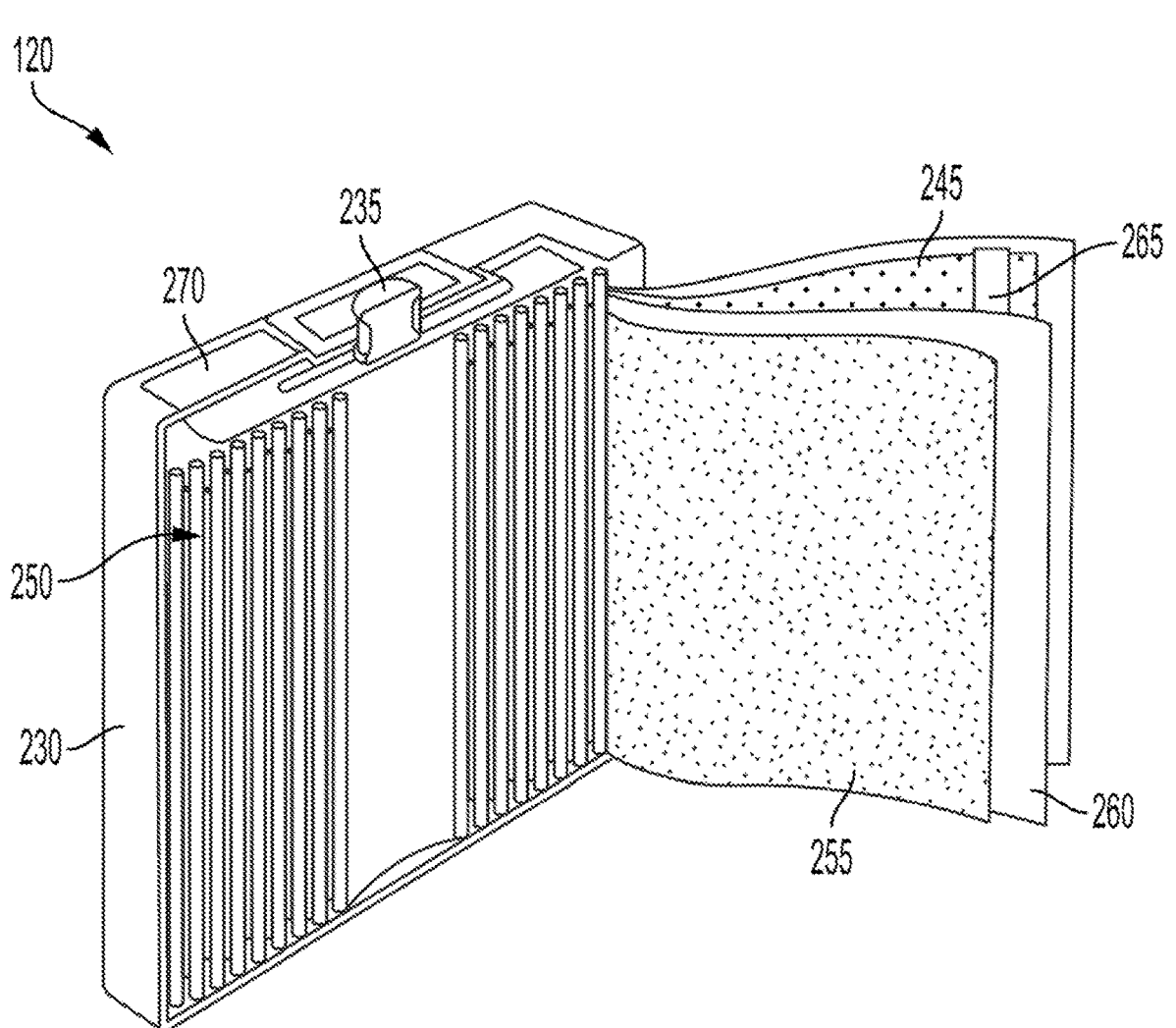
Figure 7:
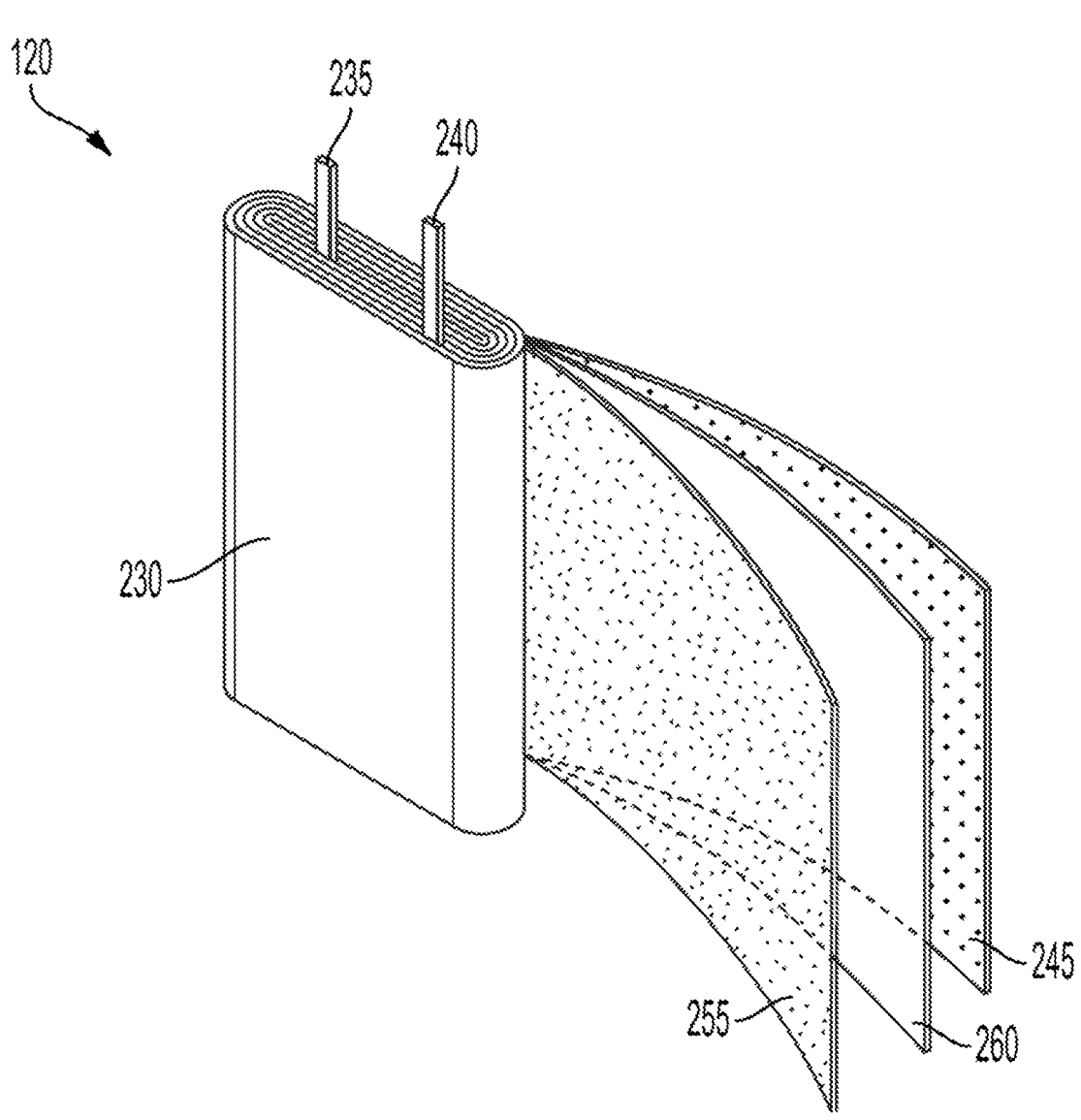

As noted above, battery cells 120 have a variety of form factors, shapes, or sizes. For example, battery cells 120 may have a cylindrical, rectangular, square, cubic, flat, or prismatic form factor. FIGS. 5, 6, and 7 depict illustrative cross sectional views of battery cells 120 in such various form factors. For example, FIG. 5 is a cylindrical cell, FIG. 6 is a prismatic cell, and FIG. 7 is the cell for use in a pouch. The battery cells 120 may be assembled by inserting a wound or stacked electrode roll (e.g., a jellyroll) including a separator (e.g., polymeric sheet) or electrolyte material (e.g., solid state electrolyte) into at least one battery cell housing 230. The electrolyte material, e.g., an ionically conductive fluid or other material, may generate or provide electric power for the battery cell 120. In an embodiment, the separator is wetted by a liquid electrolyte during a liquid electrolyte filling operation after insertion of the jellyroll. A first portion of the electrolyte material may have a first polarity, and a second portion of the electrolyte material may have a second polarity. The housing 230 may be of various shapes, including cylindrical or rectangular, for example. Electrical connections may be made between the electrolyte material and components of the battery cell 120. For example, electrical connections with at least some of the electrolyte material may be formed at two points or areas of the battery cell 120, for example to form a first polarity terminal 235 (e.g., a positive or anode terminal) and a second polarity terminal 240 (e.g., a negative or cathode terminal). The polarity terminals may be made from electrically conductive materials to carry electrical current from the battery cell 120 to an electrical load, such as a component or system of the electric vehicle 105.

The battery cell 120 can be included in battery modules 115 or battery packs 110 to power components of the electric vehicle 105. In any embodiment of the present technology, the battery pack (e.g., battery pack 110) may or may not include a battery module (e.g., battery module 115). By way of an example of a battery pack that does not include a battery module, the battery pack may have a cell-to-pack configuration where battery cells are arranged directly into a battery pack without assembly into a module. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 may include at least one anode layer 245, which may be disposed within the cavity 250 defined by the housing 230. The anode layer 245 may receive electrical current into the battery cell 120 and output electrons during the operation of the battery cell 120 (e.g., charging or discharging of the battery cell 120). The anode layer 245 may include an active substance.

The battery cell 120 may include at least one cathode layer 255 (e.g., a composite cathode layer compound cathode layer, a compound cathode, a composite cathode, or a cathode). The cathode layer 255 may be disposed within the cavity 250. The cathode layer 255 may output electrical current out from the battery cell 120 and may receive electrons during the discharging of the battery cell 120. The cathode layer 255 may also release lithium ions during the discharging of the battery cell 120. Conversely, the cathode layer 255 may receive electrical current into the battery cell 120 and may output electrons during the charging of the battery cell 120. The cathode layer 255 may receive lithium ions during the charging of the battery cell 120.

The battery cell 120 may include a polymer separator comprising a liquid electrolyte in the case of Li-ion batteries or a solid-state electrolyte layer 260 in the case of solid-state batteries, disposed within the cavity 250. The separator or solid-state electrolyte layer 260 may be arranged between the anode layer 245 and the cathode layer 255 to separate the anode layer 245 and the cathode layer 255. The liquid electrolyte or solid-state electrolyte layer 260 may transfer ions between the anode layer 245 and the cathode layer 255. The liquid or solid electrolytes can transfer cations (e.g., Li$^+$ ions) from the anode layer 245 to the cathode layer 255 during a discharge operation of the battery cell 120. The liquid or solid electrolyte can transfer cations (e.g., Li$^+$ ions) from the cathode layer 255 to the anode layer 245 during a charge operation of the battery cell 120.

FIG. 6 is an illustration of a prismatic battery cell 120. The prismatic battery cell 120 may have a housing 230 that defines a rigid enclosure. The housing 230 may have a polygonal base, such as a triangle, square, rectangle, pentagon, among others. For example, the housing 230 of the prismatic battery cell 120 may define a rectangular box. The prismatic battery cell 120 may include at least one anode layer 245, at least one cathode layer 255, and at least one separator and electrolyte or an electrolyte layer 260 disposed within the housing 230. The prismatic battery cell 120 may include a plurality of anode layers 245, cathode layers 255, and separator or electrolyte layers 260. For example, the layers 245, 255, 260 may be stacked or in a form of a flattened spiral. The prismatic battery cell 120 may include an anode tab 265. The anode tab 265 may contact the anode layer 245 and facilitate energy transfer between the prismatic battery cell 120 and an external component. For example, the anode tab 265 may exit the housing 230 or electrically couple with a positive terminal 235 to transfer energy between the prismatic battery cell 120 and an external component.

The battery cell 120 may also include a pressure vent 270. The pressure vent 270 may be disposed in the housing 230. The pressure vent 270 may provide pressure relief to the battery cell 120 as pressure increases within the battery cell 120. For example, gases may build up within the housing 230 of the battery cell 120. The pressure vent 270 may provide a path for the gases to exit the housing 230 when the pressure within the battery cell 120 reaches a threshold.

The present technology, thus generally described, will be understood more readily by reference to the following examples, which are provided by way of illustration and are not intended to be limiting of the present technology.

EXAMPLES

First-principles density functional theory (DFT)-based methodologies can be used to determine, understand, and pre-select LPSCl synthesis pathways. The DFT algorithms are used calculate the thermodynamic stability of the materials and energetics of pathways.

A $S_yY_w$, in accordance with the present technology, was recognized by the inventors to bear several unique properties that render it a suitable reaction medium/solvent and a reagent concurrently (a solvent-reagent, or "co-solvent-reagent"; "CSR"). For example, many $S_yCl_w$ compounds are a liquid within the temperature window of $-80°$ C. to $130°$ C. and exhibit high solubility for its constituents, used widely in rubber, lubricant, organic synthesis, dye and other industries.

As illustrated in the reactions and calculated reaction enthalpies disclosed in Table 1 below, compositional—and hence chemical potential—controllability of the solvent-reagent of the present technology allows flexibility in which Li and P sources can be utilized. In particular, Table 1 provides nominal reactions of synthesis to be encountered within use of the reagents listed in Table 1, where brackets indicate the corresponding reactants present with the $S_yY_w$ solvent-reagent.

TABLE 1

Nominal reactions of an exemplary LPSCl-type synthesis
Reaction

| |
|---|
| 6 Li + 0.5 P$_2$S$_5$ + [1.5 S + S$_y$Y$_w$$^{excess}$]$_{sol}$ à Li$_6$PS$_5$Y |
| 6 Li + P + [4 S + S$_y$Y$_w$$^{excess}$]$_{sol}$ à Li$_6$PS$_5$Y |
| 6 Li + PCl$_3$ + 7 [S + S$_y$Y$_w$$^{excess}$]$_{sol}$ + [SY]$_{sol}$ à Li$_6$PS$_5$Y + [S$_y$Y$_w$$^{excess}$]$_{sol}$ |
| 6 Li + PCl$_5$ + 9 [S + S$_y$Y$_w$$^{excess}$]$_{sol}$ à Li$_6$PS$_5$Y + 4 [S$_y$Y$_w$$^{excess}$]$_{sol}$ |
| 6 LiCl + PCl$_5$ + 15 [S + S$_y$Y$_w$$^{excess}$]$_{sol}$ à Li$_6$PS$_5$Cl + 10 [S$_y$Y$_w$$^{excess}$]$_{sol}$ |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or devices, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for synthesizing $Li_{7-x}PS_{6-x}Y_x$, the process comprising:

contacting a lithium source with a phosphorus source in a solvent-reagent at a temperature from about 80° C. to about 120° C. to form a precipitate comprising the $Li_{7-x}PS_{6-x}Y_x$ where Y is Cl, Br, or I and $0<x<2$ and a supernate; and collecting the precipitate;

wherein the solvent-reagent comprises $S_yY_w$ where $y≥1$ and $0<w≤2$; and wherein the lithium source comprises lithium foil, lithium ribbon, lithium particles, or lithium sand.

2. The process of claim 1, wherein the lithium source further comprises LiCl, $Li_2S$, LiP, $Li3_P$, or a mixture of any two or more thereof.

3. The process of claim 1, wherein the phosphorus source comprises $P^0$, $PCl_3$, $PCl_5$, $P_2S_5$, or a mixture of any two or more thereof.

4. The process of claim 1, wherein $1<y≤50$.

5. The process of claim 1, wherein the solvent-reagent comprises $S_yCl_w$.

6. The process of claim 1, wherein x is 1.

7. The process of claim 1, wherein the contacting is conducted substantially in the absence of oxygen, water, or both oxygen and water.

8. The process of claim 1, wherein the contacting is conducted substantially in the absence of at least one of: oxygen and moisture.

9. The process of claim 1, wherein the contacting further comprises precipitating the $Li_{7-x}PS_{6-x}Y_x$ by seeding with exogenous $Li_{7-x}PS_{6-x}Y_x$.

10. The process of claim 1 further comprising lowering the temperature of the supernate to induce additional precipitation of the $Li_{7-x}PS_{6-x}Y_x$.

11. The process of claim 1 which is conducted in a continuous reactor.

12. The process of claim 1 which is conducted in a batch reactor.

13. The process of claim 1, wherein the lithium source comprises lithium foil, lithium ribbon, or lithium particles.

* * * * *